(12) United States Patent
Hamilton et al.

(10) Patent No.: US 8,296,571 B2
(45) Date of Patent: *Oct. 23, 2012

(54) EXPORT CONTROL FOR A GNSS RECEIVER

(75) Inventors: Jeffery A. Hamilton, Westminster, CO (US); Stuart Riley, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1480 days.

This patent is subject to a terminal disclaimer.

(21) Appl. No.: 11/804,425

(22) Filed: May 18, 2007

(65) Prior Publication Data

US 2008/0288787 A1    Nov. 20, 2008

(51) Int. Cl.
   *G06F 21/00* (2006.01)
(52) U.S. Cl. ..... 713/182; 713/155; 713/150; 342/357.4; 342/357.2; 342/357.43; 342/350; 342/457; 340/988; 340/989; 340/991; 340/992; 340/993; 340/426.15; 340/426.19; 455/456.1; 455/422.1; 701/32.3; 701/400; 701/445; 701/447; 701/516
(58) Field of Classification Search .......... None
   See application file for complete search history.

(56) References Cited

U.S. PATENT DOCUMENTS

| | | | |
|---|---|---|---|
| 4,860,352 A | 8/1989 | Laurance et al. | |
| 5,640,452 A | 6/1997 | Murphy | |
| 5,887,269 A * | 3/1999 | Brunts et al. | 701/486 |
| 6,317,500 B1 | 11/2001 | Murphy | |
| 6,370,629 B1 | 4/2002 | Hastings et al. | |
| 6,768,942 B1 | 7/2004 | Chojnacki | |
| 6,948,066 B2 * | 9/2005 | Hind et al. | 713/168 |
| 7,194,620 B1 * | 3/2007 | Hayes | 713/157 |
| 7,512,989 B2 * | 3/2009 | Scott | 726/30 |
| 7,706,837 B2 * | 4/2010 | Ladouceur | 455/556.1 |
| 7,898,409 B2 * | 3/2011 | Loomis et al. | 340/539.13 |
| 7,911,400 B2 * | 3/2011 | Kaplan et al. | 343/713 |
| 7,933,611 B2 * | 4/2011 | Bocking et al. | 455/456.4 |
| 8,032,152 B2 | 10/2011 | Manson et al. | |
| 8,054,181 B2 * | 11/2011 | Van Wyck Loomis et al. | 340/539.13 |
| 8,150,421 B2 * | 4/2012 | Ward et al. | 455/456.5 |
| 2002/0121969 A1 * | 9/2002 | Joao | 340/425.5 |
| 2003/0071899 A1 * | 4/2003 | Joao | 348/148 |
| 2003/0190911 A1 * | 10/2003 | Hirano | 455/423 |
| 2004/0024522 A1 | 2/2004 | Walker et al. | |
| 2004/0044911 A1 | 3/2004 | Takada et al. | |
| 2004/0078594 A1 * | 4/2004 | Scott | 713/201 |
| 2004/0112238 A1 * | 6/2004 | Talbot | 102/200 |
| 2004/0155969 A1 * | 8/2004 | Hayashi | 348/207.99 |
| 2004/0198386 A1 * | 10/2004 | Dupray | 455/456.1 |
| 2004/0243285 A1 * | 12/2004 | Gounder | 701/1 |
| 2005/0154904 A1 | 7/2005 | Perepa et al. | |
| 2005/0248444 A1 * | 11/2005 | Joao | 340/426.13 |
| 2006/0030333 A1 * | 2/2006 | Ward et al. | 455/456.1 |
| 2007/0005244 A1 * | 1/2007 | Nadkarni | 701/213 |
| 2007/0055445 A1 * | 3/2007 | Janky et al. | 701/213 |
| 2007/0087756 A1 * | 4/2007 | Hoffberg | 455/450 |
| 2007/0155489 A1 * | 7/2007 | Beckley et al. | 463/29 |
| 2007/0174467 A1 * | 7/2007 | Ballou et al. | 709/227 |
| 2008/0018545 A1 * | 1/2008 | Kaplan et al. | 343/713 |

(Continued)

*Primary Examiner* — Syed A. Zia

(57) ABSTRACT

Embodiments of the present invention recite a method and system for implementing export control for a Global Navigation Satellite System (GNSS) receiver. In one embodiment, a GNSS receiver is used to determine the geographic position of an electronic device. It is then determined that the geographic region corresponds to an exclusion zone. In response to determining that the geographic region corresponds to the exclusion zone, accessing data from the electronic device is prevented.

24 Claims, 5 Drawing Sheets

U.S. PATENT DOCUMENTS

2008/0086685 A1* 4/2008 Janky et al. .................. 715/700
2009/0005061 A1* 1/2009 Ward et al. ................ 455/456.1
2009/0322890 A1* 12/2009 Bocking et al. ............ 348/211.2
2010/0031024 A1 2/2010 Hayes

* cited by examiner

EXPORT CONTROL FOR A GNSS RECEIVER

FIELD OF THE INVENTION

Embodiments of the present invention are related to geographic position determining systems.

RELATED APPLICATIONS

The present invention benefits from U.S.P.T.O. application Ser. No. 11/804,410 filed May 18, 2007 titled "Method and System for GNSS Receiver Login Protection and Prevention," by Jeffrey A. Hamilton and Stuart Riley, assigned to the assignee of the present invention, and which is hereby incorporated by reference in its entirety herein.

BACKGROUND OF THE INVENTION

Geographic data is increasingly used to provide geo-spatial data to a wide variety of business, government, and academic applications. Increasingly, remote Global Navigation Satellite System (GNSS) receivers are used to collect position data in a wide variety of electronic devices. For example, the GNSS receivers are now incorporated into cellular telephones, personal digital assistants (PDAs), dedicated navigation devices, surveying instruments, construction equipment, etc. Additionally, GNSS receivers are often used to monitor the geographic position of high value items such as vehicles, laptop computer systems, or even packages which are being shipped. Thus, there are a wide variety of commercially available devices which utilize satellite navigation technology.

However, satellite navigation systems may be considered "dual-use" technology which means that the satellite navigation system may be used in a commercial, or military, application. As an example, a group or nation may convert a commercial satellite navigation device to a military purpose as a low-cost alternative to acquiring a military satellite navigation device with a dedicated military function. This also subverts monitoring of weapons proliferation, especially the proliferation of precision guided weapons.

SUMMARY OF THE INVENTION

Embodiments of the present invention recite a method and system for implementing export control for a Global Navigation Satellite System (GNSS) receiver. In one embodiment, a GNSS receiver is used to determine the geographic position of an electronic device. It is then determined that the geographic region corresponds to an exclusion zone. In response to determining that the geographic region corresponds to the exclusion zone, accessing data from the electronic device is prevented.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "using," "determining," "preventing," "receiving," "decrypting," "accessing," "comparing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
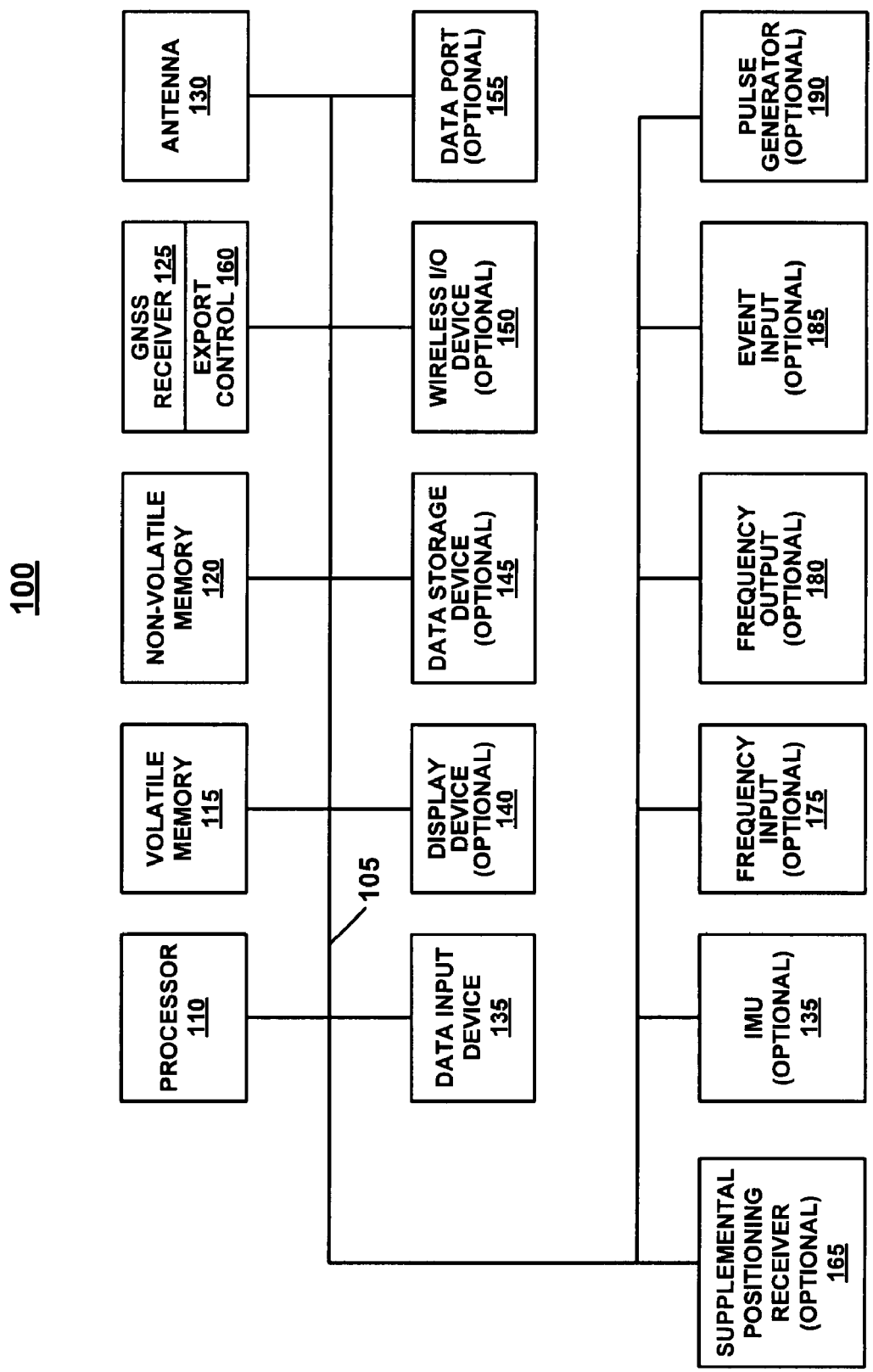
FIG. 1 is a block diagram of an exemplary electronic device equipped with a Global Navigation Satellite System (GNSS) receiver in accordance with embodiments of the present invention.

FIG. 1 is a block diagram of an exemplary electronic device 100 which is equipped with a Global Navigation Satellite System (GNSS) receiver in accordance with embodiments of the present invention. In embodiments of the present invention, electronic device 100 is a dedicated position determining device such as a surveying station, a personal navigation system, or the like. In other embodiments, electronic device is not used primarily as a position determining device, but is equipped with a GNSS component which provides that functionality. For example, cellular telephones, PDAs, and automobiles are increasingly equipped with some form of GNSS capability in order to provide a user with geographic positioning information. Thus, it is noted that particular implementations of electronic device 100 may comprise additional components which are omitted in this discussion for clarity. In the embodiment of FIG. 1, electronic device 100 comprises an address/data bus 105 for conveying digital information between the various components, a central processor unit (CPU) 110 for processing the digital information and instructions, a volatile memory 115 comprised of volatile random access memory (RAM) for storing the digital information and instructions, and a non-volatile read only memory (ROM) 120 for storing information and instructions of a more permanent nature.

Electronic device 100 further comprises a GNSS receiver 125 for determining the geographic position (e.g., latitude and longitude) of electronic device 100. In the following discussion, GNSS receiver 125 comprises a GNSS receiver in accordance with one embodiment of the present invention. It is noted that in embodiments of the present invention, GNSS receiver 125 may be capable of determining additional data such as the height of electronic device 100 and/or the current time. In embodiments of the present invention, electronic device 100 further comprises an antenna 130 coupled with GNSS receiver 125. As discussed above, while the present embodiment specifically cites a GNSS position determining system, embodiments of the present invention are well suited to utilize a variety of terrestrial-based and satellite-based position determining systems as well.

Electronic device 100 further comprises an optional data input device 135 (e.g., a keyboard, a cursor control device, a touch screen assembly, a track-ball, joystick, or special keys on alpha-numeric input 107 capable of signaling movement of a given direction or manner displacement, etc. Electronic device 100 further comprises an optional data display device 140. In addition, electronic device 100 may also include an optional data storage device 145 (e.g., a magnetic, optical, floppy, or tape drive or the like) for storing vast amounts of data. In one embodiment, data storage device 145 is a removable data storage device. It should be noted that the software program for performing GNSS receiver login protection and prevention of the present invention may be stored either in volatile memory 115 or data storage device 145.

In the embodiment of FIG. 1, electronic device 100 further comprises an optional wireless input/output (I/O) device 150 and an optional data port 155 for communicatively coupling electronic device 100 with, for example, geospatial data collection device 120 using a data cable.

Also shown in FIG. 1 is an export control component 160. In one embodiment, export control component 160 is integrated into GNSS receiver 125 in a manner which prevents tampering with the functionality of export control component 160. In one embodiment, if export control component 160 is altered or removed from GNSS receiver 125, accessing GNSS receiver 125 is prevented until an operable version of export control component 160 is restored to GNSS receiver 125. As will be discussed in greater detail below, there are a variety of ways in which accessing GNSS receiver 125 is prevented in accordance with embodiments of the present invention. In embodiments of the present invention, portions of export control component 160 comprise electronic instructions which are resident in non-volatile memory 120 and/or volatile memory 115. Non-volatile memory 120 and volatile memory 115 are two examples of non-transitory computer usable storage media. In embodiments of the present invention, export control component 160 is for determining whether electronic device 100 is currently located in an exclusion zone. For the purposes of the present invention, an exclusion zone is a geographic region in which GNSS positioning data is not to be made accessible using electronic device 100. In embodiments of the present invention, if export control component 160 determines that electronic device 100 is currently located in an exclusion zone, access to GNSS receiver 125 is prevented. It is further noted that export control component may be implemented to enforce commercial exclusion zones in addition to other considerations which may determine exclusion zones. Thus, if an entity, such as a communications network for example, utilizes GNSS derived data, access to this data can be prevented if that entity fails to pay a royalty or other fee. Another example in which commercial exclusion zones may be implemented in accordance with the present invention is to prevent purchasing electronic device 100 in a low cost region and re-selling it in a higher cost region in order to turn a profit. In embodiments of the present invention, export control component 160 limits the operation of electronic device 100 to regions in which it is allowed to operate (e.g., a low cost region) to prevent unauthorized re-selling at a profit.

In embodiments of the present invention, prevention of the accessing of GNSS receiver 125 may be accomplished in a variety of ways. In one embodiment, the geographic position of electronic device 100 cannot be accessed or stored internally by any component of electronic device 110 if it is currently located in an exclusion zone. In another embodiment, operation of GNSS receiver 125 may be suspended until an approved user code is entered. In another embodiment, a vendor identification and/or product identification may be required to resume operation of GNSS receiver 125. In another embodiment, if electronic device 100 is currently in an exclusion zone, input/output of raw measurements (e.g., signal phase and/or pseudorange), or the logging thereof, which may be used by an external program to derive a geographic position is prevented. One method for restricting the use of position determining devices to defined regions in accordance with embodiments of the present invention is described in U.S. application Ser. No. 11/362,972 filed Feb. 27, 2006, titled, "Method and System for Restricting the Use of Position Determining Devices to Defined Regions," by Vivek Nadkarni, assigned to the assignee of the present invention, and which is hereby incorporated by reference in it entirety herein.

In the embodiment of FIG. 1, electronic device 100 further comprises an optional supplemental positioning receiver 165. In embodiments of the present invention, supplemental positioning receiver 165 utilizes signals from sources other than GNSS satellites to determine the geographic position of electronic device 100. In embodiments of the present invention, these signals include, but are not limited to cellular telephone signals, digital television signals, Long Range Radio Aid to Navigation (LORAN) signals, etc.

In the embodiment of FIG. 1, electronic device 100 further comprises an optional inertial measurement unit (IMU) 170. In embodiments of the present invention, inertial measurement unit 170 detects changes in the motion of electronic device 100 which can be used to determine the geographic position of electronic device 100. In one embodiment of the present invention, inertial measurement unit 170 utilizes a gyroscope to detect changes in the motion of electronic device 100. In another embodiment, inertial measurement unit 165 utilizes at least one accelerometer to detect changed in the motion of electronic device 100. It is noted that in one embodiment, an accelerometer capable of detecting a change of motion in more than one axis or plane of motion may be used by inertial measurement unit 170.

In the embodiment of FIG. 1, electronic device 100 also comprises an optional frequency input 175. In embodiments of the present invention, frequency input 175 receives a reference frequency output by a device (e.g., a GNSS reference station). Electronic device 100 may then synchronize to the frequency received by frequency input 175.

In the embodiment of FIG. 1, electronic device 100 also comprises an optional frequency output 180. In embodiments of the present invention, electronic device 100 may output a reference frequency which is used by other devices for synchronization as described above.

In the embodiment of FIG. 1, electronic device 100 also comprises an optional event input 185. In embodiments of the present invention, electronic device 100 can record an event and timestamp the event using event input 185.

In the embodiment of FIG. 1, electronic device 100 also comprises an optional pulse generator 190. In embodiments of the present invention, pulse generator 190 generates a one second pulse in response to a timestamp event initiated by event input 185. It is noted that the timing of the pulse generated by pulse generator 190 may have a higher or lower frequency than one pulse per second in embodiments of the present invention. Additionally, pulse generator 190 may generate some other trigger in response to a timestamp event in embodiments of the present invention.

As will be discussed in greater detail below, embodiments of the present invention can facilitate the export of devices which incorporate geographic position determining devices while reducing the likelihood that they can be mis-used by, for example, commercial entities, rogue nations, or other groups. For example, in a certain government is deemed likely to misuse GNSS data, that nation may be designated as a restricted area. As a result, use of electronic device 100, or a component thereof, to determine a geographic position will be prevented. Alternatively, exported devices (e.g., electronic device 100) may be allowed to operate overseas, but are prevented from being used to determine a geographic position in a region proximate to the United States, or another sensitive region. This facilitates implementing weapons proliferation controls as electronic device 100, or more specifically, GNSS receiver 125 cannot be altered for use as, for example, a weapons guidance system, or used in a manner which circumvents a commercial agreement. Thus, even if an unintended third party should gain control of a properly exported version of electronic device 100, that third party cannot use or alter electronic device 100, or GNSS receiver 125, within a designated exclusion zone.

Additionally, in embodiments of the present invention, the designated exclusion zones may be dynamically updated to reflect changed relations. For example, if the government determines that a nation is to no longer be excluded from using GNSS receiver 125 and/or electronic device 100, the definition of which geographic regions are considered exclusion zones can be updated to reflect the new status of that nation. Alternatively, if the price of electronic device 100 in a previously excluded region is now comparable to the price of the same electronic device in a second region, the definitions of the exclusion zones can be updated such that electronic device 100 can be operated and data accessed therefrom in the previously excluded region. This may be implemented as a software/firmware update for electronic device 100 and/or GNSS receiver 125. Alternatively, this may performed as registration step when first bringing electronic device 100 into operation.

Figure 2:
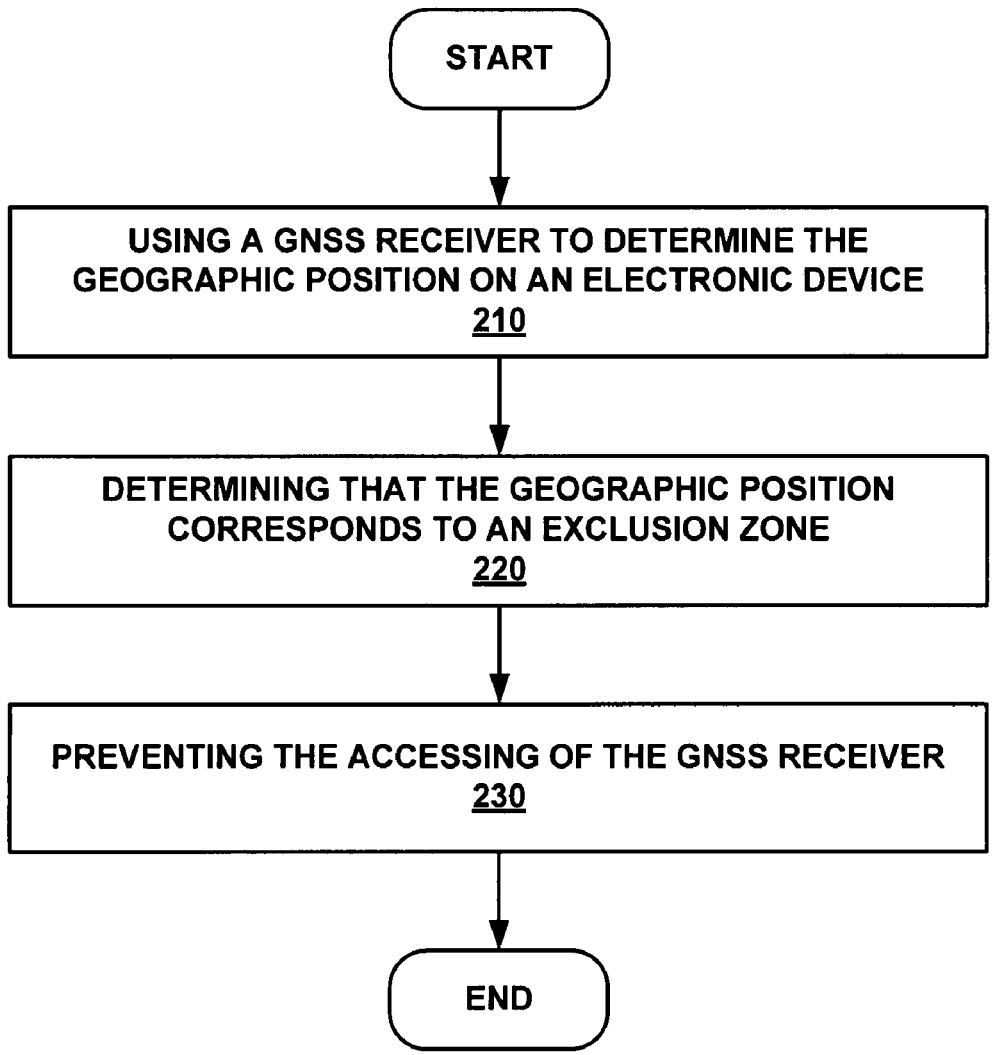
FIG. 2 is a flowchart of a method for implementing export control of a GNSS receiver in accordance with an embodiment of the present invention.
Figure 3:
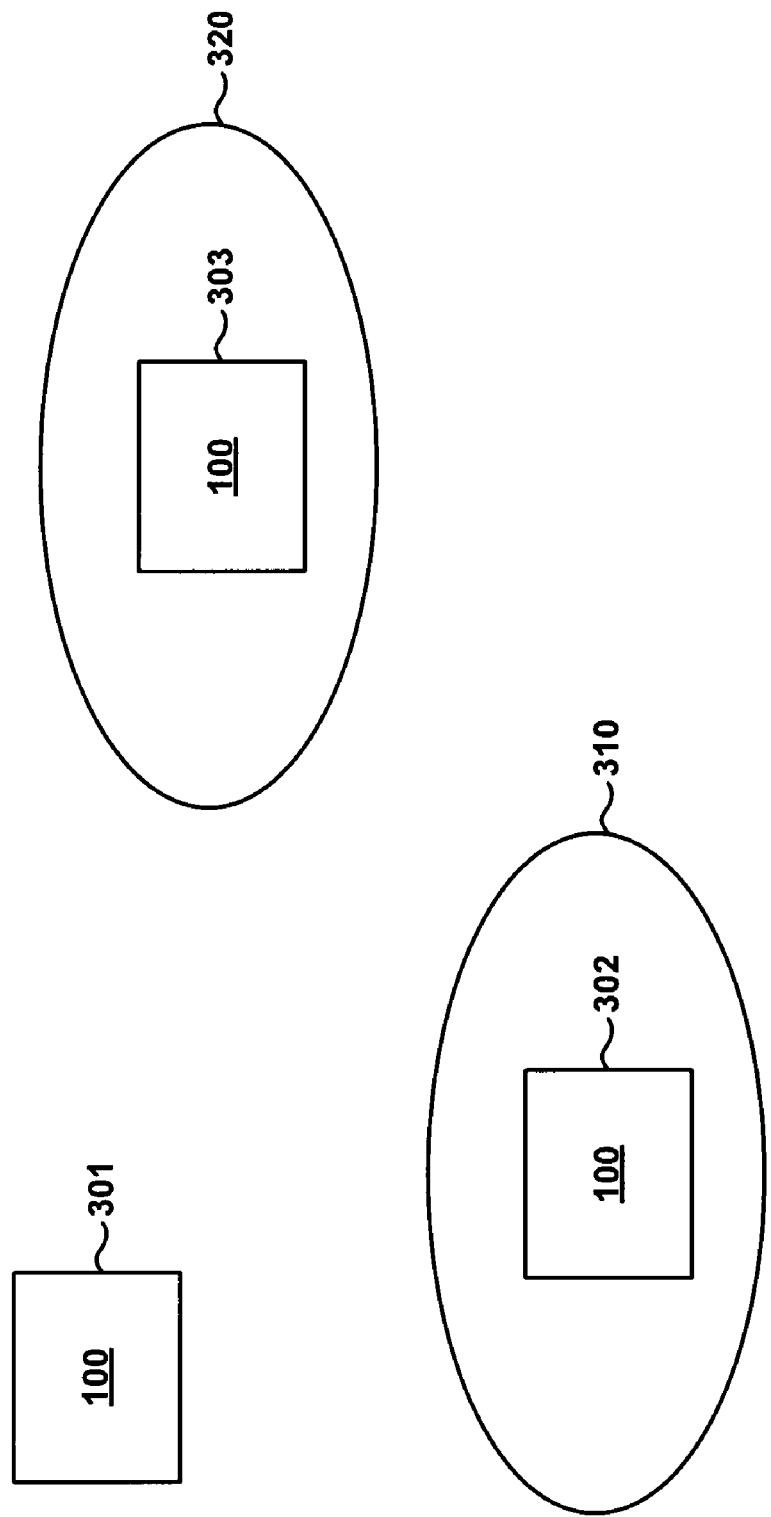
FIG. 3 shows the operation of an exemplary export control system of a GNSS receiver in accordance with an embodiment of the present invention.

FIG. 2 is a flowchart of a method 200 for implementing export control of a GNSS receiver in accordance with an embodiment of the present invention. Instructions for causing an electronic device to perform steps of method 200 are, in some embodiments, embodied on a non-transitory computer usable storage medium. In step 210 of FIG. 2, a GNSS receiver is used to determine a geographic position. With reference to FIG. 3, in embodiments of the present invention, an electronic device 100 uses a GNSS receiver (e.g., 125 of FIG. 1) to determine its position. In the example of FIG. 3, electronic device 100 determines that its geographic position is at location 302 of FIG. 3.

In step 220 of FIG. 2, it is determined that the geographic position determined in step 210 corresponds to an exclusion zone. In the present example, location 302 is within a set of geographic coordinates which define an exclusion zone 310.

In step 230 of FIG. 2, accessing of the GNSS receiver is prevented in response to determining that its geographic position corresponds to the exclusion zone. In embodiments of the present invention, the user of electronic device 100 is not permitted to access GNSS receiver 125 in response to determining that electronic device 100 is currently located within exclusion zone 310. In one embodiment, this comprises preventing GNSS data from being accessed by electronic device 100 and/or another electronic device. In another embodiment, the user of electronic device 100 is not permitted to generate commands to or configure operating parameters of GNSS receiver 125 while it is located within exclusion zone 310. In another embodiment, the user is not permitted to utilize electronic device 100 while it is located within exclusion zone 310. In embodiments of the present invention, when GNSS receiver 125 determines that it is no longer within exclusion zone 310, it becomes accessible to the user of electronic device 100. In another embodiment, the user of electronic device 100 has to perform a registration process to re-activate accessing GNSS receiver 125 after leaving exclusion zone 310.

Thus, when the user of electronic device 100 moves to location 301, GNSS receiver 125 and/or electronic device 100 may again become available to the user. As shown in FIG. 3, electronic device 100 may receive an update comprising the geographic coordinates of a second exclusion zone 320. For example, this may be performed when a software/firmware update for GNSS receiver 125 and/or electronic device 100 is performed. Thus, if electronic device 100 is moved to second exclusion zone 320 (e.g., location 303), the user of electronic device 100 will again be unable to access GNSS receiver 125 and/or electronic device 100 until they leave exclusion zone 320.

In one embodiment of the present invention, GNSS receiver 125 and/or electronic device 100 may be configured to query for these updates every time it is powered up. In addition, the software and/or firmware version used may require a periodic verification. Thus, if the software/firmware version used by GNSS receiver 125 and/or electronic device 100 is not current (e.g., more than 30 days old), access to GNSS receiver 125 and/or electronic device 100 is not permitted until the current version is downloaded and implemented. It is noted that there are a variety of methods which may be used to implement loading a current set of coordinates which define one or more exclusion zones in accordance with embodiments of the present invention.

Because embodiments of the present invention permit dynamic definition of exclusion zones, it is also possible to quickly redefine one or more of the exclusion zones to permit operation of GNSS receiver 125 and/or electronic device 100 within that zone. For example, an update may remove the geographic coordinates of exclusion zone 310 and/or 320 from the list of exclusion zones. As a result, a user of electronic device 100 will not be restricted from accessing GNSS receiver 125 or data therefrom. Thus, the functionality of electronic device 100 is not permanently limited based upon it being currently located at, for example, location 302 of FIG. 3.

In one embodiment of the present invention, accessing of the GNSS receiver comprises preventing the generation of a geographic position. In another embodiment of the present invention, accessing of the GNSS receiver comprises preventing a measurement operation using raw measurements of pseudorange and/or phase data from a satellite navigation system. In one embodiment, accessing of the GNSS receiver comprises preventing internal position and/or measurement logging. In one embodiment, accessing of the GNSS receiver comprises preventing the reception of an external frequency. In one embodiment, accessing of the GNSS receiver comprises preventing a time pulse operation. In one embodiment, accessing of the GNSS receiver comprises preventing a graphical display of geographic position information on a display device of electronic device 100. In one embodiment of the present invention, communication interfaces (e.g., wireless I/O device 150 and data port 155 of FIG. 1) of electronic device 100 including wireless and wired communication interfaces, are locked to prevent retrieving data from electronic device 100.

In another embodiment of the present invention, access to electronic device 100, both wired and wireless, is shut down and electronic device 100 displays a message stating that it currently is located in an exclusion zone. In one embodiment, electronic device 100 is still able to access the Internet for further instructions. In so doing, it is possible to determine that electronic device 100 is currently in an exclusion zone and an unauthorized operation (e.g., accessing satellite navigation data) is being performed. In one embodiment, an encrypted position fix of electronic device is sent as well to assist in determining the geographic position of electronic device 100. It is noted that in embodiments of the present invention, combinations of the above mentioned actions may be performed in response to determining that electronic device 100 is currently located in an exclusion zone.

Figure 4:
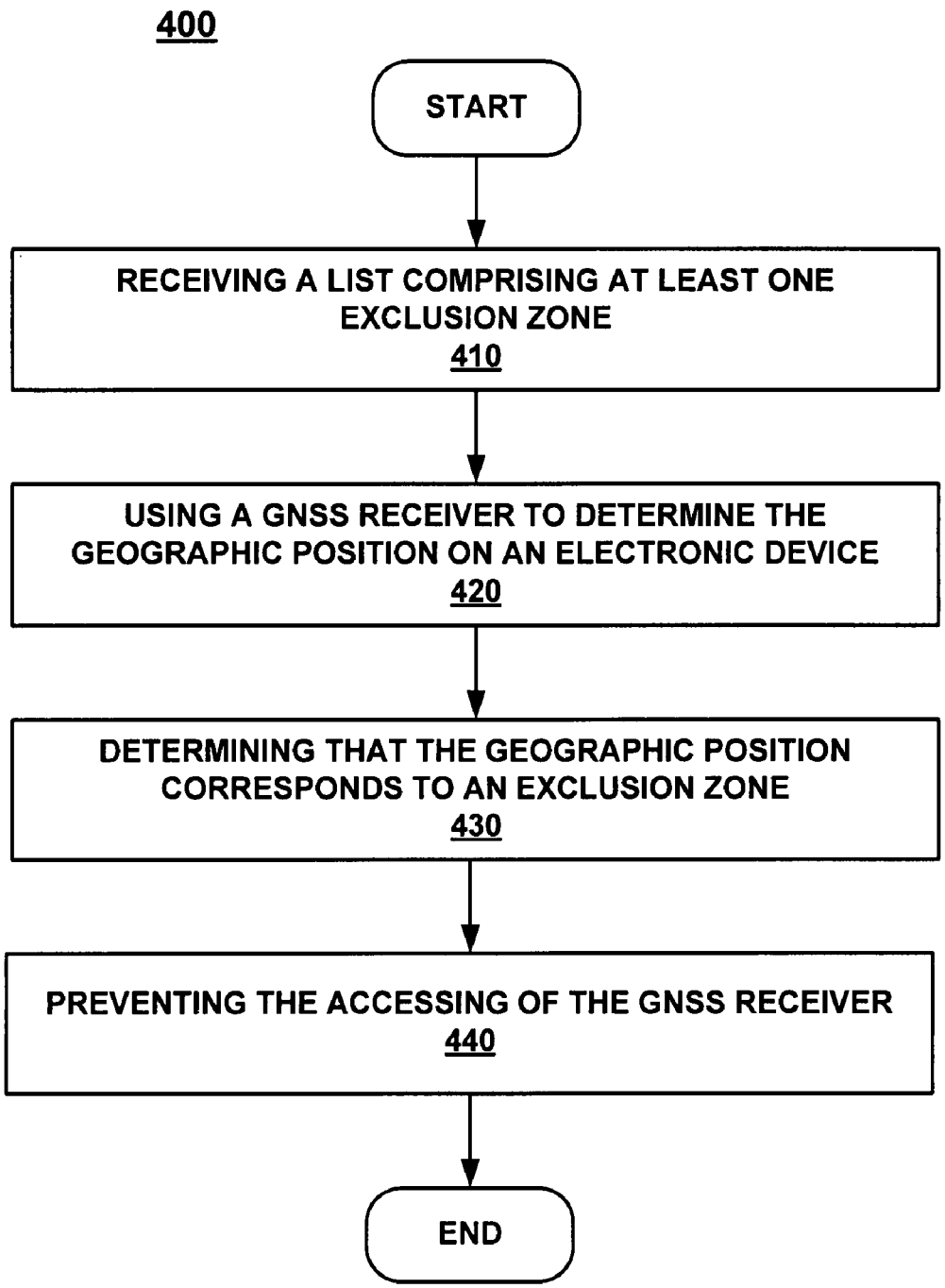
FIG. 4 is a flowchart of a method for implementing dynamic export control of a GNSS receiver in accordance with an embodiment of the present invention.

FIG. 4 is a flowchart of a method 400 for implementing dynamic export control of a GNSS receiver in accordance with an embodiment of the present invention. Instructions for causing an electronic device to perform steps of method 400 are, in some embodiments, embodied on a non-transitory computer usable storage medium. In step 410 of FIG. 4, a list comprising a set of geographic coordinates of at least one exclusion zone is received. As described above, in embodiments of the present invention, a dynamic list of coordinates which define an exclusion zone can be downloaded into electronic device 100 and/or GNSS receiver 125. In one embodiment, electronic device 100 is required to periodically download an encrypted set of exclusion zones via, for example, the Internet or other communication network. In one embodiment, if the download is not performed recently (e.g., within 90 days prior to the current date), the GNSS receiver will not provide a geographic position, or raw measurement data for deriving a geographic position to a user at any location.

In step 420 of FIG. 4, a GNSS receiver is used to determine a geographic position. As discussed above with reference to step 210, in embodiments of the present invention, a GNSS receiver determines its current geographic position. It is noted that in one embodiment, the actual determination of the geographic position of electronic device may be performed by, for example, processor 110 of electronic device. Thus in one embodiment, while processor 110 actually determines the geographic position of electronic device 100, it still relies upon GNSS data from GNSS receiver 125.

In step 430 of FIG. 4, it is determined that the geographic position determined in step 210 corresponds to an exclusion zone. As discussed above with reference to step 220 of FIG. 2, export control component 160 of FIG. 1 determines that the geographic position determined in step 420 corresponds to an exclusion zone.

In step 440 of FIG. 4, accessing of the GNSS receiver is prevented in response to determining that its geographic position corresponds to the exclusion zone. As discussed above with reference to step 230 of FIG. 2, accessing of GNSS receiver 125 is prevented if it is determined that electronic device 100 and/or GNSS receiver 125 is within a defined exclusion zone.

Figure 5:
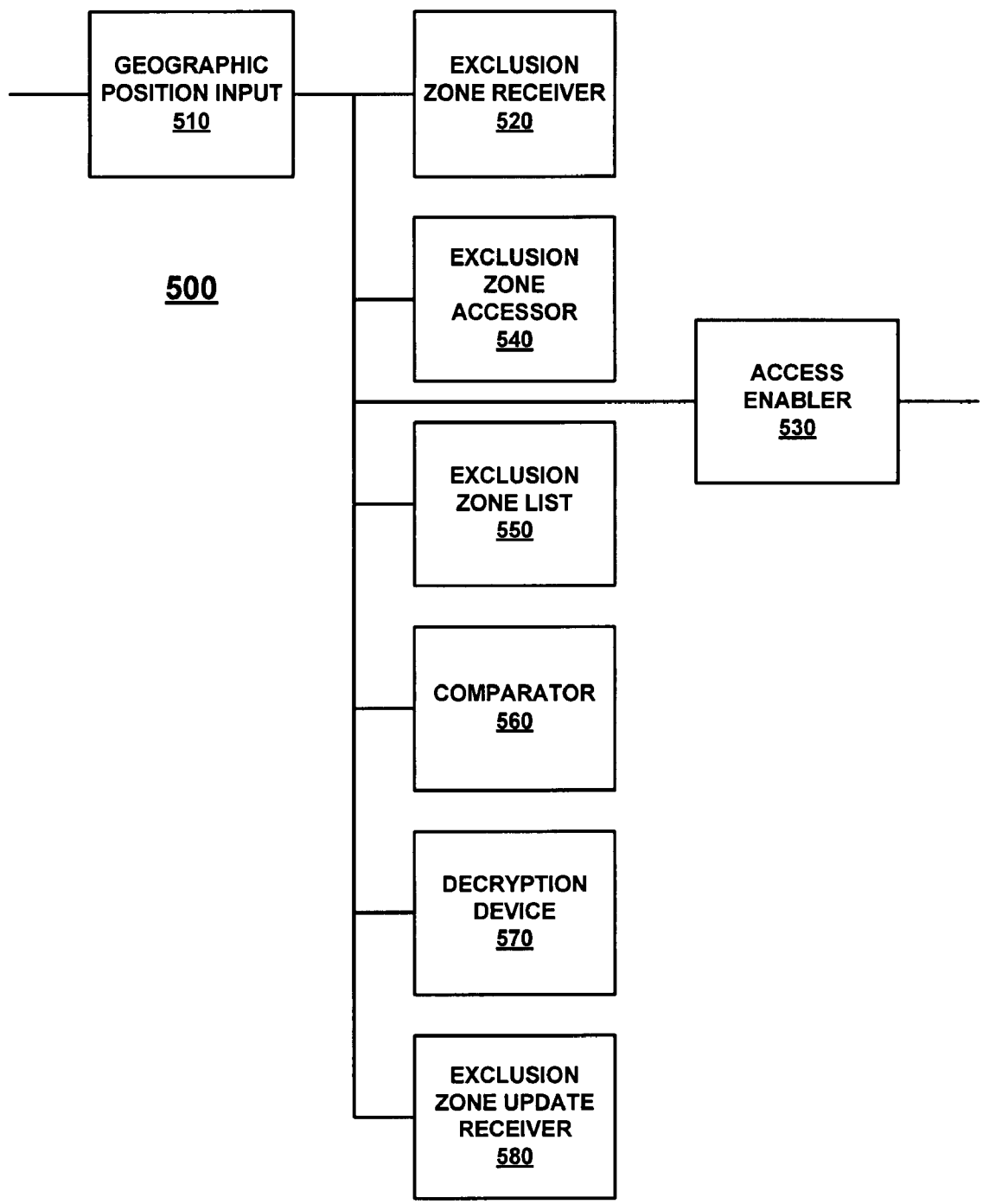
FIG. 5 is a block diagram of an export control implementation system in accordance with an embodiment of the present invention.

FIG. 5 is a block diagram of an export control implementation system 500 in accordance with an embodiment of the present invention. In the embodiment of FIG. 5, system 500 comprises a geographic position input 510 for receiving a geographic position from GNSS receiver 125. System 500 further comprises an exclusion zone determiner 520 for determining that the geographic position from geographic position input 510 corresponds to an exclusion zone. As described above, an exclusion zone defines a region in which it is desired that access to GNSS receiver 125, or data therefrom, shall not be accessible. System 500 further comprises an access enabler 530 for preventing the accessing of GNSS receiver 125, or data therefrom, if it is determined that the geographic position of GNSS receiver 125 is within a defined exclusion zone (e.g., location 302 of FIG. 3). As discussed above with reference to FIGS. 2 and 3, there are a variety of actions which may be initiated by access enabler 530 for preventing the accessing of data from electronic device 100 and/or GNSS receiver 125 in response to determining that the geographic position of GNSS receiver 125 is within a defined exclusion zone System 500 further comprises an exclusion zone accessor 540 for accessing exclusion zone list 550 which comprises the geographic coordinates which define at least one exclusion zone. System 500 further comprises a comparator 560 for comparing the geographic coordinates of GNSS receiver 125 received via geographic position input 510 and comparing them with the geographic coordinates of the exclusion zone(s) defined in exclusion zone list 550. System 500 further comprises a decryption device 570 for decrypting the geographic coordinates of an exclusion zone defined in exclusion zone list 550. In embodiments of the present invention, the geographic coordinates of defined exclusion zones may be encrypted to prevent circumvention of the export control system of the present invention.

In one embodiment, an exclusion zone may comprise a portion of a larger encrypted number stored in exclusion zone list 550. For example, exclusion zone list 550 may store a 64-bit number or sequence. However, the exclusion zone is identified by only a portion (e.g., a 32-bit sequence) of that 64-bit number. Thus, an end user will have a harder time determining what the number or sequence is which identifies an exclusion zone, particularly because the number or sequence is encrypted. In another embodiment, exclusion zone list 550 may be encrypted using standard encryption techniques (e.g., the MD-5, SHA-1, etc.). In one embodiment, a private key is loaded into each GNSS receiver (e.g., 125 of FIG. 1) during production which is inaccessible to a user of electronic device 100. As described above, in one embodiment, electronic device 100 is required to periodically download an encrypted set of exclusion zones via, for example, the Internet or other communication network. In one embodiment, if the download is not performed recently (e.g., within 90 days prior to the current date), the GNSS receiver will not provide a geographic position, or raw measurement data for deriving a geographic position to a user at any location. As a result, it is more difficult for an end user to circumvent the export control system of the present invention. It is noted that embodiments of the present invention are not limited to 64-bit or 32-bit sequences and that these values were selected for exemplary purposes only. One method for utilizing encrypted region identifiers which may be used in accordance with embodiments of the present invention is described in U.S. application Ser No. 11/804,410 filed May 18, 2007 titled "Method and System for GNSS Receiver Login Protection and Prevention," by Jeffrey A. Hamilton and Stuart Riley, assigned to the assignee of the present invention, and which is hereby incorporated by reference in it entirety herein.

In FIG. 5, system 500 further comprises an exclusion zone update receiver 580. Exclusion zone update receiver 580 is for receiving updates to exclusion zone list 550 such as the geographic coordinates of additional exclusion zones (e.g., 320 of FIG. 3), or the removal of an exclusion zone (e.g., exclusion zone 310 of FIG. 3) from exclusion zone list 550.

Embodiments of the present invention, export control for a GNSS receiver, are thus described. While the present invention has been described in particular embodiments, it should be appreciated that the present invention should not be construed as limited by such embodiments, but rather construed according to the following claims.

What is claimed is:

1. A method for implementing export control for a Global Navigation Satellite System (GNSS) receiver, said method comprising:
   using said GNSS receiver to determine a geographic position of an electronic device;
   determining that said geographic position corresponds to an exclusion zone; and
   preventing accessing of said GNSS receiver by said electronic device in response to said determining.

2. The method as recited in claim 1 wherein said determining further comprises:
   accessing a list comprising at least one of said exclusion zone.

3. The method as recited in claim 2 further comprising:
   comparing said geographic position with said exclusion zone.

4. The method as recited in claim 2 further comprising:
   receiving an update to said list comprising a second exclusion zone.

5. The method as recited in claim 2 further comprising:
   receiving an update to said list wherein at least one exclusion zone is removed from said list.

6. The method as recited in claim 2 wherein said accessing further comprises:
   decrypting a description of said exclusion zone.

7. The method as recited in claim 1 wherein said preventing further comprises:
   preventing the accessing of geographic data from said GNSS receiver.

8. A non-transitory computer-usable storage medium having computer-readable program code embodied therein for causing an electronic device to perform the steps of:
   using a GNSS receiver to determine a geographic position of an electronic device;
   determining that said geographic position corresponds to an exclusion zone; and
   preventing accessing of said GNSS receiver by said electronic device in response to said determining.

9. The non-transitory computer-usable storage medium of claim 8 wherein said determining further comprises:
   accessing a list comprising at least one of said exclusion zone; and
   comparing said geographic position with said exclusion zone.

10. The non-transitory computer-usable storage medium of claim 9 further comprising:
    receiving an update to said list comprising a second exclusion zone.

11. The non-transitory computer-usable storage medium of claim 9 further comprising:
    receiving an update to said list wherein at least one exclusion zone is removed from said list.

12. The non-transitory computer-usable storage medium of claim 9 wherein said accessing further comprises:
    decrypting a description of said exclusion zone.

13. The non-transitory computer-usable storage medium of claim 8 wherein said preventing further comprises:
    preventing accessing of geographic data from said GNSS receiver.

14. A system for implementing export control restrictions in an electronic device, said system comprising:
    a geographic position input for receiving a geographic position from a GNSS receiver;
    an exclusion zone determiner for determining that said geographic position corresponds to an exclusion zone; and
    an access enabler for preventing accessing of said GNSS receiver by said electronic device in response to said determining.

15. The system of claim 14 wherein said exclusion zone determiner further comprises:
    an exclusion zone accessor for accessing an exclusion zone list comprising at least one of said exclusion zone.

16. The system of claim 15 wherein said exclusion zone determiner further comprises:
    a comparator for comparing said geographic position with said exclusion zone.

17. The system of claim 15 further comprising:
    an exclusion zone update receiver for receiving an update to said list comprising a second exclusion zone.

18. The system of claim 17 wherein said exclusion zone update receiver is further for receiving an update to said list wherein at least one exclusion zone is removed from said list.

19. The system of claim 15 further comprising:
    a decryption device for decrypting a description of said exclusion zone.

20. The system of claim 14 wherein said access enabler is further for preventing accessing of geographic data from said GNSS receiver.

21. A method for implementing dynamic export control for a Global Navigation Satellite System (GNSS) receiver, said method comprising:
    receiving a list comprising a set of geographic coordinates of at least one exclusion zone;
    using said GNSS receiver to determine a geographic position;

determining that said geographic position corresponds to said at least one exclusion zone; and preventing accessing of GNSS data from said GNSS receiver in response to said determining.

22. The method as recited in claim 21 wherein said determining further comprises:

comparing said geographic position with said set of geographic coordinates of said at least one exclusion zone.

23. The method as recited in claim 22 wherein said accessing further comprises:

decrypting set of geographic coordinates of said at least one exclusion zone.

24. The method as recited in claim 21 wherein said preventing further comprises:

preventing the accessing of said geographic position from said GNSS receiver.

* * * * *